United States Patent Office 3,483,205
Patented Dec. 9, 1969

3,483,205
BICYCLIC TETRAHYDROPYRIMIDINES
Richard William James Carney, New Providence, N.J., assignor to Ciba Corporation, Summit, N.J., a corporation of Delaware
No Drawing. Continuation-in-part of application Ser. No. 515,766, Dec. 22, 1965. This application Dec. 22, 1967, Ser. No. 692,688
Int. Cl. C07d 51/48; A61k 27/00
U.S. Cl. 260—256.4   5 Claims

ABSTRACT OF THE DISCLOSURE

Bicyclic 1-aryl-dihydro- and tetrahydro-pyrimidines, e.g. those of the formulae

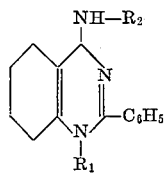

and

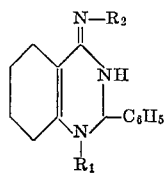

$R_1$=aliphatic or aromatic radical, and $R_2$=H or $R_1$; N-oxides, quaternaries and salts thereof exhibit antiinflammatory effects.

CROSS-REFERENCES TO RELATED APPLICATIONS

This is a continuation-in-part of application Ser. No. 515,766, filed Dec. 22, 1965, now abandoned.

SUMMARY OF THE INVENTION

The present invention concerns and has for its object the provision of new bicyclic 1-aryl-1,4-dihydro- or tetrahydro-pyrimidines having the Formulae I and II

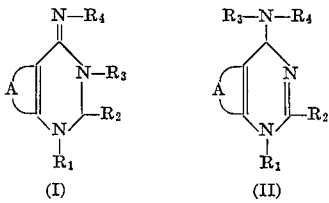

in which A is a divalent aliphatic radical having from 3 to 5 ring-carbon atoms, each of $R_1$ and $R_2$ is an aliphatic or aromatic radical, $R_3$ is hydrogen or an aliphatic radical and $R_4$ is hydrogen, an aliphatic or aromatic radical, N-oxides, quaternaries and salts thereof, as well as of corresponding pharmaceutical compositions and of methods for the preparation of these products. Said compositions are useful antiinflammatory agents, preferably for oral application, in place of corticosteroids, in the treatment of tissue inflammations, such as arthritic inflammations.

DESCRIPTION OF THE PREFERRED EMBODIMENTS

The divalent aliphatic radical A preferably stands for lower alkylene containing at least 3 carbon atoms, such as 1,3-propylene, 2-methyl-1,3-propylene, 1,4-butylene, 2,2-dimethyl-1,4-butylene, 1,4- or 1,5-pentylene 1,5- or 2,5-hexylene or 2,6-heptylene, but also for lower alkylene, such as 1,3-prop-1-enylene, 1,4-but-1 or 2-enylene or 1,5-pent-1-enylene. The term "lower" used above and hereinafter in connection with organic radicals or compounds respectively, defines such with up to 7, preferably up to 4, carbon atoms.

An aromatic radical $R_1$, $R_2$ and/or $R_4$ particularly stands for mono- or bicyclic carbocyclic aryl, i.e. phenyl, 1- or 2-naphthyl, or heterocyclic aryl, such as furyl, thienyl or pyridyl. Said aryl groups are unsubstituted or contain one or more than one of the same or different substituents attached to any position available for substitution, for example, lower alkyl, such as methyl, ethyl, n- or i-propyl or n-butyl, etherified hydroxy or mercapto, for example, lower alkoxy or alkylmercapto, such as methoxy, ethoxy, n- or i-propoxy or n-butoxy, methyl- or ethylmercapto, esterified hydroxy, for example, halogeno, such as fluoro, chloro or bromo, trifluoromethyl, nitro, amino, for example, di-lower alkylamino, such as dimethylamino or diethylamino. Preferred aromatic radicals are phenyl, (lower alkyl)-phenyl, (lower alkoxy)-phenyl, (lower alkylmercapto)-phenyl, (halogeno)-phenyl, (trifluoromethyl)-phenyl, (nitro)-phenyl or (di-lower alkylamino)-phenyl.

An aliphatic radical $R_1$ to $R_4$ represents especially lower alkyl, e.g. methyl, ethyl, n- or i-propyl, n-, i- or secondary-butyl, n-pentyl, n-hexyl or n-heptyl. It may also stand for higher alkyl with up to 12 carbon atoms, especially $R_1$, $R_2$ and/or $R_4$, such as n-octyl, n-nonyl, n-decyl or n-undecyl. An aliphatic radical, especially $R_1$, $R_2$ and $R_4$ is also lower alkenyl, such as allyl or methallyl, cycloalkyl or cycloalkyl-lower alkyl having from 3 to 8, especially from 3 to 6 ring-carbon atoms, such as cyclopropyl, cyclopentyl, cyclohexyl, cycloheptyl or cyclooctyl; cyclopropylmethyl, cyclopentylmethyl, 2-cyclopentylethyl, cyclohexylmethyl, 1-cyclohexylethyl or cycloheptylmethyl, as well as monocyclic carbocyclic aryl-lower alkyl, such as benzyl, 1- or 2-phenylethyl. These radicals, especially $R_4$, may contain additional substituents, especially in the aromatic portion, such as those mentioned for $R_1$, as well as oxo or thiono, or may be interrupted by heteroatoms, preferably by one oxygen, sulfur and/or nitrogen atom, whereby two heteroatoms are preferably separated by at least two carbon atoms. Such radicals are, for example, lower alkoxy-lower alkyl, such as methoxymethyl, ethoxymethyl, n-propoxymethyl, 1- or 2-methoxy-, ethoxy or i-propoxy-ethyl, 1-, 2- or 3-methoxy-, ethoxy- or n-propoxy-propyl or 4-tert. butoxy-butyl, the corresponding phenoxy-lower alkyl and lower alkylmercapto-lower alkyl groups, mono- or di-lower alkylamino-lower alkyl, lower alkyleneimino-lower alkyl or monoaza-, oxa- or -thia-alkyleneimino-lower alkyl or N-phenyl-monoaza-alkyleneimino-lower alkyl groups with 4 to 6 ring-carbon atoms and in which latter the heteroatom is preferably separated from the ring-nitrogen atom by at least two carbon atoms, such as 2-methylamino-, 2-dimethylamino- or 2-diethylamino-ethyl, 3-dimethylamino- or 3-diethylamino-propyl, 2-pyrrolidino-ethyl, 3-piperidino-propyl, 2-piperazino-ethyl, 2-(4-methyl-piperazino)-ethyl, 3-(4-ethyl-piperazino)-propyl, 2-(4-phenyl-piperazino)-ethyl, 2-morpholino-ethyl or 3-thiamorpholino-propyl.

The quaternaries are particularly those containing additional lower alkyl or aralkyl groups, such as those mentioned above, quaternizing at least one tertiary nitrogen atom present.

The compounds of this invention have valuable pharmacological properties. Apart from diuretic effects, they exhibit primarily anti-inflammatory activity, as can be demonstrated in animal tests using, for example mammals, such as rats, as test objects. Apart from their above-mentioned utility, the compounds of the invention are also valuable intermediates for the preparation of other useful products, particularly of pharmacologically active compounds. Thus, the corresponding bicyclic 1-aryl-4-imino-1,4-dihydro-pyrimidines exhibiting anti-inflammatory effects, are obtained from the compounds of this invention of dehydrogenation.

Particularly useful are compounds of the Formulae I and II in which A is 1,3-propylene, 1,4-butylene or 1,5-pentylene, each of $R_1$ and $R_2$ is alkyl with up to 12 carbon atoms, phenyl, (lower alkyl)-phenyl, (lower alkoxy)-phenyl or (haeolgno)-phenyl, $R_3$ is hydrogen or lower alkyl and $R_4$ is hydrogen, lower alkyl, 3 to 8 ring-membered cycloalkyl or cycloalkyl-lower alkyl, phenyl, (lower alkyl)-phenyl, (lower alkoxy)-phenyl, (halogeno)-phenyl, amino-lower alkyl, mono- or di-lower alkylamino-lower alkyl, lower alkyleneimino-lower alkyl, monoaza-, -oxa- or -thiaalkyleneimino-lower alkyl, wherein the heteroatoms present are separated from each other by at least two carbon atoms and acid addition salts thereof.

Especially mentioned are those compounds of the Formulae I and II, in which A is 1,4-butylene, each of $R_1$ and $R_2$ is phenyl, 4-methoxy-phenyl, 4-fluoro-phenyl or 4-chloro-phenyl, $R_3$ is hydrogen and $R_4$ is lower alkyl, 3 to 6 ring-membered cycloalkyl, phenyl, 4-methoxy-phenyl, 4-fluoro-phenyl or 4-chloro-phenyl, and therapeutically acceptable acid addition salts thereof, which, when given orally to rats at doses between about 5 and 50 mg./kg./day, preferably between about 10 and 25 mg./kg./day, show outstanding anti-inflammatory effects according to the granuloma pouch or carrageenin paw test.

The compounds of this invention are prepared according to known methods. For example, the process for their preparation consists in:

(a) reducing a corresponding bicyclic 1-$R_1$-2-$R_2$-4-$R_4$-imino-1,4-dihydro-pyrimidine, or (b) condensing a corresponding N-$R_3$-N'-$R_4$-amidine of a 2-$R_1$-imino-cycloaliphatic carboxylic acid with an $R_2$-aldehyde, or (c) reacting a corresponding bicyclic 1-$R_1$-2-$R_2$-4-alkoxy- or alkyl-mercapto-1,2-dihydro-pyrimidine with ammonia or a primary $R_4$-amine and, if desired, converting any compound obtained into another disclosed compound.

In the reduction according to (a) either catalytically activated or nascent hydrogen alone, for example hydrogen in the presence of nickel, platinum or palladium catalysts, or electrolytically generated hydrogen may be used, which predominantly yields the compounds of Formula I. Reducing agents, for example, complex light metal hydrides, such as alkali metal aluminum or borohydrides, e.g. lithium aluminum hydride or sodium borohydride, preferably yield the compounds of Formula II.

In the condensation according to (b) any water formed may either be distilled off aceotropically or absorbed by a condensing agent, such as a carbodiimid. Both reactions (b) and (c) usually yield mixtures of the isomers of Formulae I and II, which exhibit different UV-spectra and can be separated by conventional methods, e.g. chromatography.

The compounds obtained according to said process may be converted into other disclosed compounds by methods in themselves known. Thus, for example, into any primary, secondary or tertiary amino nitrogen atom, for example into compounds in which $R_3$ and/or $R_4$ stands for hydrogen, a substituent may be introduced, if necessary after conversion of the compound obtained into a metal, e.g. alkali metal, derivative thereof. This can be done, for example, by reaction with a reactive ester of an appropriate alcohol, for example, that of a hydrohalic, e.g. hydrochloric, hydrobromic or hydriodic acid, or a sulfonic acid, such as a lower alkane or benzene sulfonic acid, e.g. methane, ethane or p- toluene sulfonic acid, or an aryl diazonium salt, whereby higher substituted amines or quaternaries are obtained; or by reductive alkylation, i.e. reaction with an appropriate oxo compound and subsequent reduction, or by oxidation, for example with hydrogen peroxide, a percarboxylic or sulfonic acid, e.g. peracetic, perbenxoic, monoperphthalic or p-toluene persulfonic acid, in order to obtain the N-oxides. In compounds, amino-substituted by radicals which can be eliminated, for example, amino-substituted by α-arylalkyl, e.g. benzyl, or phthaloyl radicals, the said radicals can be split off in the usual manner by hydrogenolysis or hydrazinolysis.

The above mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheic pressure. Condensing agents are especially used in the reaction with said reactive ester of an alcohol in order to eliminate the acid formed. They are basic agents, for example, an alkali or alkaline earth metal carbonate or lower alkoxide, or more especially, an organic base such as pyridine or collidine, but particularly an aliphatic tertiary amine, such as a tri-lower alkylamine, e.g. triethylamine.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic, aromatic or heterocyclic carboxylic or sulfonic acids, for example, formic, acetic, propionic, succinic, glyollic, lactic, malic tartaric citric, ascorbic, maleic, hydroxymaleic, pyroracemic, phenylacetic, benzoic, aminobenzoic, anthranilic, hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts of the new compounds, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components may be used in the form of their salts.

Mainly, those starting materials should be used in the reactions of the invention that lead to the formation of those compounds indicated above as being specially valuable.

The starting material used in reaction (a) is disclosed in the above mentioned co-pending application; it is preferably used in the form of the free base. The amidines used in reaction (b) may be obtained from corresponding nitriles by reaction with ammonia, amines or metal amides, e.g., aminomagnesium halides or sodium amides, or by condensation of corresponding acid amides with amines, preferably in the presence of phosphorus trichloride or oxychloride. The 1,2-dihydro-pyrimidines used as starting material in reaction (c) may be prepared analogously to the reaction (b) using instead of the amidines corresponding imido esters.

The compounds of this invention are useful in the form of compositions for enteral, parenteral or topical administration which contain a pharmacologically effective amount of the compounds of this invention in admixture with a pharmaceutically acceptable, organic or inorganic, solid or liquid carrier, which usually represents the major portion of the pharmaceutical composition. For making up the latter, there are employed carrier materials suitable for the preparation of pharmaceutical compositions, such as water, gelatine, sugars, e.g., lactose, glucose or sucrose, starches, e.g., corn starch, wheat starch or rice starch, stearic acid or salts thereof, e.g., calcium or magnesium stearate, talc, vegetable oils, alcohol, e.g., ethanol, benzyl alcohol or cetyl alcohol, petrolatum, gums, accacia, propylene glycol, polyalkylene glycols or any other known carrier for pharmaceutical compositions. The pharmaceutical preparations may be in solid form, e.g., capsules, tablets or dragees, in liquid form, e.g., solutions or suspensions, or in the form of emulsions, e.g., salves or creams. If desired, they may contain auxiliary substances, such as preserving, stabilizing, wetting, emulsifying, or coloring agents, salts for varying the osmotic pressure or buffers. The above preparations are prepared according to standard methods used for the manufacture of pharmaceutically acceptable compositions, which, if desired, also contain, in combination, other physiologically useful substances.

The following examples are intended to illustrate the invention and are not to be construed as being limitations thereon. Temperatures are given in degrees centigrade and all parts wherever given are parts by weight.

Example 1

0.2 g. platinum oxide in 100 ml. methanol are pre-reduced with hydrogen at atmospheric pressure. Hereupon 0.5 g. 1 - (4 - fluoro - phenyl)-2-phenyl-4-(4-fluoro-phenylimino) - 1,4,5,6,7,8-hexahydro-quinazoline in 350 ml. methanol are added and hydrogenation is resumed at atmospheric pressure and temperature. After the uptake of hydrogen has stopped, the reaction mixture is filtered, the filtrate evaporated in vacuo and the residue dissolved in diethyl ether. The solution is acidified with ethereal hydrochloric acid, the crystals formed filtered off and recrystallized from isopropanol to yield the 1-(4-fluoro-phenyl) - 2 - phenyl-4-(4-fluoro-phenylimino)-octahydro-quinazoline hydrochloride of the formula

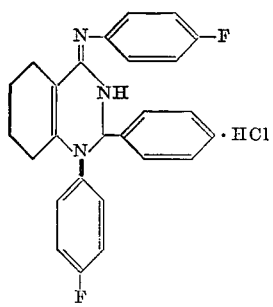

melting at 170–174°.

The starting material is prepared as follows:
The mixture of 16.1 g. 1-(4-fluoro-phenyl)-2-phenyl-4-methylmercapto - 5,6,7,8-tetrahydro-quinazolinium iodide, 80 ml. 4-fluoro-aniline and 350 ml. acetone is refluxed overnight. After cooling crystals separate, which are filtered off and recrystallized from isopropanol to yield the 1 - (4-fluoro-phenyl)-2-phenyl-(4-fluoro-phenylimino-1,4,5,6,7,8-hexahydro-quinazoline hydroiodide melting at 237–240°.

0.3 g. thereof are dissolved in 30 ml. 10% aqueous sodium hydroxide, the solution is extracted with diethyl ether, the extract dried and evaporated in vacuo. The residue is recrystallized from isopropanol to yield the 1 - (4-fluoro-phenyl)-2-phenyl-4-(4-fluoro-phenylimino)- 1,4,5,6,7,8-hexahydro-quinazoline melting at 190–192°.

Example 2

In the analogous manner, described in Example 1 the following compounds are prepared: 4-imino-, 4-methylimino-, 4-ethylimino-, 4-n-propylimino-, 4-n-butylimino-, 4-i-butylimino-, 4-tert-butylimino-, 4-n-pentylimino-, 4-i-pentylimino-, 4-n-hexylimino-, 4-(2-dimethyl- or diethylamino-ethylimino)- and 4-(3-diethylamino-propylimino)- 1 - (4-fluoro-phenyl)-2-phenyl-octahydro-quinazoline hydrochloride.

Example 3

The mixture of 1.0 g. 1-(4-chloro-phenyl)-2-phenyl-4- (4 - fluoro - phenylimino)-1,4,5,6,7,8-hexahydro-quinazoline, 1 liter ethylacetate and 0.2 g. 20% palladium on charcoal (pre-reduced in 200 ml. ethylacetate) is hydrogenated at atmospheric pressure and temperature until one mole equivalent of hydrogen has been absorbed. It is then filtered, the residue washed with chloroform and the filtrate evaporated in vacuo. The residue is recrystallized from isopropanol to yield the 1-(4-chloro-phenyl)- 2-phenyl-4-(4-fluoro-phenylimino)-octahydro-quinazoline of the formula

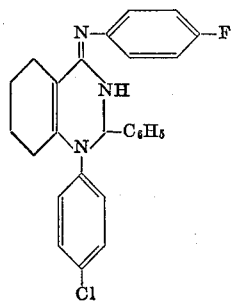

melting at 277–279°, UV $\lambda_{max}$=298 (14,680).

The starting material is prepared as follows: The mixture of 5.0 g. 2-phenyl-4-thio-5,6,7,8-tetrahydro-1,3-benzoxazine and 5.1 g. 4-chloro-aniline is heated in a sealed tube to 100° for six hours. The reaction mixture is suspended in acetone, the suspension filtered and the residue washed with acetone to yield the 1-(4-chloro-phenyl) - 2 - phenyl - 4 - thio - 5,6,7,8 - tetrahydroquinazoline melting at 296–299°.

The mixture of 12.0 g. thereof, 100 ml. methyl iodide and 2.1 liter acetone is refluxed overnight. Hereupon it is evaporated in vacuo and the residue recrystallized from acetone to yield the 1-(4-chloro-phenyl)-2-phenyl-4-methylmercapto-5,6,7,8-tetrahydro-quinazolinium iodide melting at 275–277°.

The mixture of 1.0 g. thereof, 4 ml. 4-fluoro-aniline and 25 ml. acetone is refluxed for two days. Hereupon, it is evaporated in vacuo and the residue recrystallized from isopropanol to yield the 1-(4-chloro-phenyl)- 4 - (4 - fluoro - phenylimino) - 1,4,5,6,7,8 - hexahydro-quinazoline hydroiodide. It is taken up in the minimum amount of aqueous methanol and the solution made basic with 25% aqueous potassium hydroxide while stirring. The precipitate formed is filtered off and washed with water to yield the corresponding free base melting at 241–242°.

Example 4

According to the method described in Example 3, the following componds of Formula I are prepared from equivalent amount of the corresponding 2,3-dehydro compound: A=1,4-butylene, $R_2$=phenyl, $R_3$=hydrogen.

| $R_1$ | $R_4$ | UV $\lambda_{max}$ | M.P. 2,3-dehydro-I·HI |
|---|---|---|---|
| 4-Cl—$C_6H_4$ | 4-Cl—$C_6H_4$ | 304 (20,380) | 278–280° |
| 4-F—$C_6H_4$ | H | About 300 | 288–290° |
| 4-F—$C_6H_4$ | $CH_3$ | ----do---- | 335–337° |
| 4-F—$C_6H_4$ | $C_2H_5$ | ----do---- | 121–123° |
| 4-F—$C_6H_4$ | n-$C_3H_7$ | ----do---- | 127–129° |
| 4-F—$C_6H_4$ | i-$C_3H_7$ | ----do---- | 148–150° |
| 4-F—$C_6H_4$ | n-$C_4H_9$ | ----do---- | 193–195° |
| 4-F—$C_6H_4$ | i-$C_4H_9$ | ----do---- | 202–204° |
| 4-F—$C_6H_4$ | tert.-$C_4H_9$ | ----do---- | 218–220° |
| 4-F—$C_6H_4$ | n-$C_5H_{11}$ | ----do---- | 182° |
| 4-F—$C_6H_4$ | i-$C_5H_{11}$ | ----do---- | 172–174° |
| 4-F—$C_6H_4$ | n-$C_6H_{13}$ | ----do---- | 202–204° |
| 4-F—$C_6H_4$ | $CH_2$—$CH_2$—N$(CH_3)_2$ | ----do---- | 125–128° |
| 4-F—$C_6H_4$ | $(CH_2)_3$—N(n-$C_4H_9)_2$ | ----do---- | 113–115° |
| 4-F—$C_6H_4$ | $CH_2$—$CH_2$—N(pyrrolidinyl) | ----do---- | 219–221° |
| 4-F—$C_6H_4$ | $CH_2$—$CH_2$—N(morpholinyl) | ----do---- | 195° |
| $C_6H_5$ | $C_6H_5$ | ----do---- | 294–296° |
| $C_6H_5$ | 4-F—$C_6H_4$ | ----do---- | 288–290° |
| 4-F—$C_6H_4$ | 4-F—$C_6H_4$ | ----do---- | 242–244° |
| 4-F—$C_6H_4$ | 4-$CH_3$O—$C_6H_4$ | ----do---- | 245–247° |

Example 5

To the solution of 3.5 g. 1-(4-fluoro-phenyl)-2-phenyl-4-(4-fluoro-phenylimino)-1,4,5,6,7,8-hexahydro-quinazoline in 1.5 liter ethanol, 4.0 g. sodium borohydride are added portionwise while stirring, whereupon the mixture is refluxed for 2 hours. During this time the original yellow mixture turns colorless. It is evaporated in vacuo, the residue taken up in water and the mixture extracted with diethyl ether. The extract is dried, filtered and evaporated. The residue is recrystallized from benzene-hexane to yield the 1-(4-fluoro-phenyl)-2-phenyl-4-(4-fluoro-phenylamino)-1,4,5,6,7,8-hexahydro-quinazoline of the formula

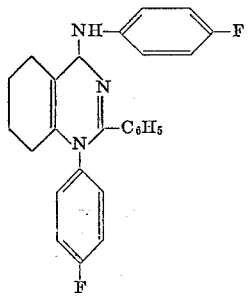

melting at 142–144°, UV $\lambda_{max}$ 338 (13,220).

Example 6

In the manner described in Example 5, the following compounds of Formula II are prepared from equivalent amounts of the corresponding 4-imino-starting material: A=1,4-butylene, $R_2$=phenyl and $R_3$=hydrogen.

| $R_1$ | $R_4$ | M.P. | $\lambda_{max}$ | M.P 4-imino-II·HI |
|---|---|---|---|---|
| 4-F-$C_6H_4$ | $CH_2$—$CH(CH_3)_2$ | 92–93° | 330 | 171–174° |
| 4-F-$C_6H_4$ | Cyclopropyl | 123–125° | 331 | 283–286° |
| $C_6H_5$ | Cyclopropyl | 135–137° | 334 | 257–258° |
| $C_6H_5$ | 4-F-$C_6H_4$ | 122–124° | 340 | 288–290° |
| 4-Cl-$C_6H_4$ | 4-F-$C_6H_4$ | 132–134° | 329 | 189–191° |

I claim:

1. The bicyclic 1,4-dihydro-pyrimidine having the formula

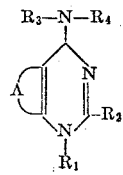

in which A is lower alkylene having from 3 to 5 ring-carbon atoms, each of $R_1$ and $R_2$ is alkyl with up to 12 carbon atoms, phenyl, (lower alkyl)-phenyl, (lower alkoxy)-phenyl or (halogeno)-phenyl, $R_3$ is hydrogen or lower alkyl and $R_4$ is hydrogen, lower alkyl, 3 to 8 ring-membered cycloalkyl or cycloalkyl-lower alkyl, phenyl, (lower alkyl)-phenyl, (lower alkoxy)-phenyl, (halogeno)-phenyl, amino-lower alkyl, mono- or di-lower alkylamino-lower alkyl, lower alkyleneimino-lower alkyl, monoaza-, -oxa- or -thia-lower alkyleneimino-lower alkyl, wherein the heteroatoms present are separated from each other by at least two carbon atoms, or a therapeutically useful acid addition salt thereof.

2. A compound as claimed in claim 1, in which formula A is 1,4-butylene, each of $R_1$ and $R_2$ is phenyl, 4-methoxy-phenyl, 4-fluoro-phenyl or 4-chloro-phenyl, $R_3$ is hydrogen and $R_4$ is lower alkyl, 3 to 6 ring-membered cycloalkyl, phenyl, 4-methoxy-phenyl, 4-fluoro-phenyl or 4-chloro-phenyl, and theropeutically acceptable acid addition salts thereof.

3. A compound as claimed in claim 1 and being the 1-(4-fluoro-phenyl)-2-phenyl-4-(4-fluoro-phenylamino-1,4,5,6,7,8-hexahydro-quinazoline and a therapeutically acceptable acid addition salt thereof.

4. A compound as claimed in claim 1 and being the 1-(4-chloro-phenyl)-2-phenyl-4-(4-fluoro-phenylamino)-1,4,5,6,7,8-hexahydro-quinazoline and a therapeutically acceptable acid addition salt thereof.

5. A compound as claimed in claim 1 and being the 1-(4-fluoro-phenyl)-2-phenyl-4-cyclopropyl-amino-1,4,5,6,7,8-hexahydro-quinazoline and a therapeutically acceptable acid addition salt thereof.

References Cited

UNITED STATES PATENTS

| | | | |
|---|---|---|---|
| 3,403,152 | 9/1968 | Blatter | 260—256.4 |
| 3,403,153 | 9/1968 | Blatter et al. | 260—256.4 |
| 3,301,855 | 1/1967 | Blatter | 260—256.4 |
| 3,322,759 | 5/1967 | Carney et al. | 260—256.4 |
| 3,340,260 | 9/1967 | Blatter | 260—256.4 |
| 3,357,981 | 12/1967 | Ursprung et al. | 260—256.4 |

ALEX MAZEL, Primary Examiner

R. J. GALLAGHER, Assistant Examiner

U.S. Cl. X.R.

260—239.65, 256.5; 424—229, 251